United States Patent
Abduljaber et al.

(10) Patent No.: US 10,820,194 B2
(45) Date of Patent: Oct. 27, 2020

(54) SYSTEMS AND METHODS FOR SECURING ACCESS TO COMPUTING RESOURCES BY AN ENDPOINT DEVICE

(71) Applicant: Duo Security, Inc., Ann Arbor, MI (US)

(72) Inventors: Omar Abduljaber, Ann Arbor, MI (US); Geoff Keyes, Ann Arbor, MI (US); Kyle Mills, Ann Arbor, MI (US); Harold T. Chapman, Ann Arbor, MI (US); Peter Johnson, Ann Arbor, MI (US); Trevor Hough, Ann Arbor, MI (US)

(*) Notice: Subject to any disclaimer, the term of this patent is extended or adjusted under 35 U.S.C. 154(b) by 0 days.

(21) Appl. No.: 16/568,539

(22) Filed: Sep. 12, 2019

(65) Prior Publication Data
US 2020/0128020 A1    Apr. 23, 2020

Related U.S. Application Data

(60) Provisional application No. 62/749,391, filed on Oct. 23, 2018.

(51) Int. Cl.
*H04L 29/06* (2006.01)
*H04W 12/00* (2009.01)

(52) U.S. Cl.
CPC ......... *H04W 12/0027* (2019.01); *H04L 63/08* (2013.01); *H04L 63/10* (2013.01);
(Continued)

(58) Field of Classification Search
CPC . H04L 63/105; H04L 63/08; H04L 2463/082; H04L 63/20; H04L 63/10;
(Continued)

(56) References Cited

U.S. PATENT DOCUMENTS

| 6,993,596 B2 * | 1/2006 | Hinton | G06F 21/41 709/204 |
| 7,882,538 B1 * | 2/2011 | Palmer | G06F 21/31 713/150 |

(Continued)

OTHER PUBLICATIONS

CISA, "Securing Your Web Browser", Sep. 8, 2015, https://www.us-cert.gov/publications/securing-your-web-browser.*

*Primary Examiner* — Robert B Leung
*Assistant Examiner* — Thomas Ho

(57) ABSTRACT

Systems and methods for securing web-based services of a subscriber include: identifying an access attempt by an agentless endpoint device to access web-based services of a subscriber; transmitting by the remote security service a security prompt to a third-party web browser operating on the agentless endpoint device; activating at the agentless endpoint device a non-agent security application hosted locally on the agentless endpoint device in response to the security prompt; obtaining by the non-agent security application device health data relating to one or more attributes of the agentless endpoint device; computing by the remote computer security service a health state of the agentless endpoint device based on the assessment of the device health data; and enforcing an access policy of the subscriber by denying or enabling access to the web-based services of the subscriber by the agentless endpoint device based on the computed health state.

20 Claims, 6 Drawing Sheets

(52) U.S. Cl.
CPC ..... *H04L 63/1433* (2013.01); *H04W 12/0023* (2019.01); *H04L 63/20* (2013.01); *H04L 2463/082* (2013.01)

(58) Field of Classification Search
CPC .......... H04L 63/1433; H04W 12/0023; H04W 12/0027; H04W 12/06
See application file for complete search history.

(56) References Cited

U.S. PATENT DOCUMENTS

| | | | |
|---|---|---|---|
| 8,898,746 B2* | 11/2014 | Gregg | H04L 63/10 726/29 |
| 9,426,182 B1* | 8/2016 | Zeljko | H04L 63/20 |
| 2006/0250968 A1* | 11/2006 | Hudis | H04L 43/0817 370/241 |
| 2010/0192196 A1* | 7/2010 | Lee | G06F 21/55 726/1 |
| 2014/0007215 A1* | 1/2014 | Romano | H04W 12/0027 726/12 |
| 2014/0189356 A1* | 7/2014 | Phegade | G06F 21/84 713/171 |
| 2014/0297756 A1* | 10/2014 | Qureshi | H04L 41/0816 709/205 |
| 2016/0036856 A1* | 2/2016 | Liu | H04L 63/0263 726/1 |
| 2018/0115574 A1* | 4/2018 | Ridley | H04L 63/1425 |
| 2019/0089705 A1* | 3/2019 | Chud | H04L 63/10 |

\* cited by examiner

Initializing a Non-Agent Application S205

Identifying Health Data Requirements S210

Collecting Endpoint Health Data S220

Loading Collected Endpoint Health Data S230

Generating Endpoint Health Intelligence S240

Enforcing Access Policy S250

Setting Access Policies S260

FIGURE 2

SYSTEMS AND METHODS FOR SECURING ACCESS TO COMPUTING RESOURCES BY AN ENDPOINT DEVICE

CROSS-REFERENCE TO RELATED APPLICATIONS

This application claims the benefit of U.S. Provisional Application No. 62/749,391 filed 23 Oct. 2018, which is incorporated in its entirety by this reference.

TECHNICAL FIELD

This invention relates generally to the digital security field, and more specifically to a new and useful system and method for securing and controlling access to online computing resources, electronic data, systems, and digital accounts in the computer security field.

BACKGROUND

As an enterprise security measure, entities may require that employee devices include one or more types of management agents. The management agents are typically controlled or deployed by the entity or a service provider operating a device management system. At least one aim of such management agents installed on endpoint devices is to ensure that all endpoints accessing their networks and/or web-based applications and services are healthy and secure. This involves installing management agents on employee devices to monitor and control every aspect of the device. Including but not limited to enabling encryption and wiping the phone remotely.

However, these management system may be disliked by administrators of a network because they are difficult to deploy, hard to manage, and may additionally fail to protect against unknown devices accessing a network (e.g., BYOD devices). Additionally, management agents can be removed in some circumstances without permission, therefore, placing networks and/or web-accessible resources of the entity at risk.

Thus, there is a need in the computer security field for new and useful systems and methods for securing against access by endpoint devices with potentially malicious agents hosted thereon. This invention provides such new and useful systems and methods as described in more detail below.

BRIEF SUMMARY OF THE INVENTION(S)

In one embodiment, a method for securing one or more web-based services of a subscriber to a remote computer security service includes identifying an access attempt by an agentless endpoint device to access one or more web-based services of a subscriber to a remote computer security service; prior to providing access to the one or more web-based services, transmitting by the remote security service a security prompt to a third-party web browser operating on the agentless endpoint device; activating at the agentless endpoint device a non-agent security application hosted locally on the agentless endpoint device in response to the security prompt; obtaining by the non-agent security application device health data relating to one or more attributes of the agentless endpoint device; computing by the remote computer security service a health state of the agentless endpoint device based on the assessment of the device health data; and enforcing an access policy of the subscriber by denying or enabling access to the one or more web-based services of the subscriber by the agentless endpoint device based on the computed health state.

In one embodiment, the agentless endpoint device includes a computing device without a device management agent of the subscriber installed locally on the computing device.

In one embodiment, the security prompt includes a request to open a security application (multi-factor authentication application) of the remote computer security service that is hosted on the agentless endpoint device.

In one embodiment, the non-agent security application that is hosted locally at the agentless endpoint device includes an application of and provided by the remote computer security service.

In one embodiment, the non-agent security application is configured with: a primary function for performing at least one part of a multifactor authentication of a user of the agentless endpoint device; and a secondary function for performing a security health assessment of the agentless endpoint device.

In one embodiment, activating the non-agent security application automatically loads a universal link that is registered by the non-agent security application that enables the non-agent security application to collect device health data from the agentless endpoint device and pass the device health data to the remote computer security service.

In one embodiment, activating the non-agent security application integrates an operation of non-agent security application with an operation of the web browser, wherein the integration instantiates a communication channel between the non-agent security application and the web browser through which device health data is passed from the non-agent security application to the web browser.

In one embodiment, activating the non-security application instantiates an inline frame of the remote computer security service that is integrated with the web browser of the agentless endpoint device, wherein the non-agent application passes device health data through the inline frame operating with the web browser to the remote computer security service.

In one embodiment, the non-agent security application stores device health data within a clipboard memory of the agentless endpoint device, and the non-agent security application passes the device health data from the clipboard to the inline frame operating with the web browser.

In one embodiment, the method includes at the remote computer security service: identifying access policy of the subscriber; and assessing the device health data against the access policy of the subscriber; and computing a response to the access attempt based on the assessment of the device health data against eh access policy of the subscriber.

In one embodiment, the method includes prior to passing the device health data to the remote computer security service, cryptographically signing by the non-agent application one or more data packets encapsulating the device health data; and decrypting the one or more data packets only by the remote computer security service.

In one embodiment, the remote computer security service selects the health state from a continuum of endpoint health states based on an assessment of the endpoint health data against access policy of the subscriber, wherein the continuum of endpoint health states is defined based on the access policy of the subscriber.

In one embodiment, enforcing the access policy of the subscriber includes communicating an enforcement result of the assessment of the device health data from the remote computer security service to the non-agent application, wherein the enforcement result includes the confirmation or the denial of access to the one or more web-based services of the subscriber.

In one embodiment, if the enforcement result includes a denial of access to the one or more web-based services of the subscriber, providing by denying or enabling access to the one or more web-based services of the subscriber based on the assessment of the device health data.

In one embodiment, a system for securing one or more web-based services of a subscriber to a web-based authentication service includes a web-based authentication service implemented by a distributed network of computers that: identifies an access attempt by an agentless endpoint device to access one or more web-based services of a subscriber to the web-based authentication service; prior to providing access to the one or more web-based services, transmits a security prompt to a third-party web browser operating on the agentless endpoint device; a non-agent authentication application hosted locally on the agentless endpoint device that is activated in response to the security prompt and that: obtains device health data relating to one or more attributes of the agentless endpoint device, wherein the web-based authentication service further: computes a health state of the agentless endpoint device based on the assessment of the device health data; and enforces an access policy of the subscriber by denying or enabling access to the one or more web-based services of the subscriber by the agentless endpoint device based on the computed health state.

In one embodiment, the non-agent security application that is hosted locally at the agentless endpoint device includes an application of and provided by the web-based authentication service.

In one embodiment, the non-agent security application is configured with: a primary function for performing at least one part of a multifactor authentication of a user of the agentless endpoint device; and a secondary function for performing a security health assessment of the agentless endpoint device.

In one embodiment, activating the non-agent security application automatically loads a universal link that is registered by the non-agent security application that enables the non-agent security application to collect device health data from the agentless endpoint device and pass the device health data to the web-based authentication service.

In one embodiment, activating the non-agent security application integrates an operation of non-agent security application with an operation of the web browser, and the integration instantiates a communication channel between the non-agent security application and the web browser through which device health data is passed from the non-agent security application to the web browser.

BRIEF DESCRIPTION OF THE FIGURES

FIG. 2 illustrates a method 200 for evaluating a health state of an endpoint and enforcing access policy in accordance with one or more embodiments of the present application;

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

1. System for Agentless Device Health Enforcement Using a Non-Agent Application

Figure 1:
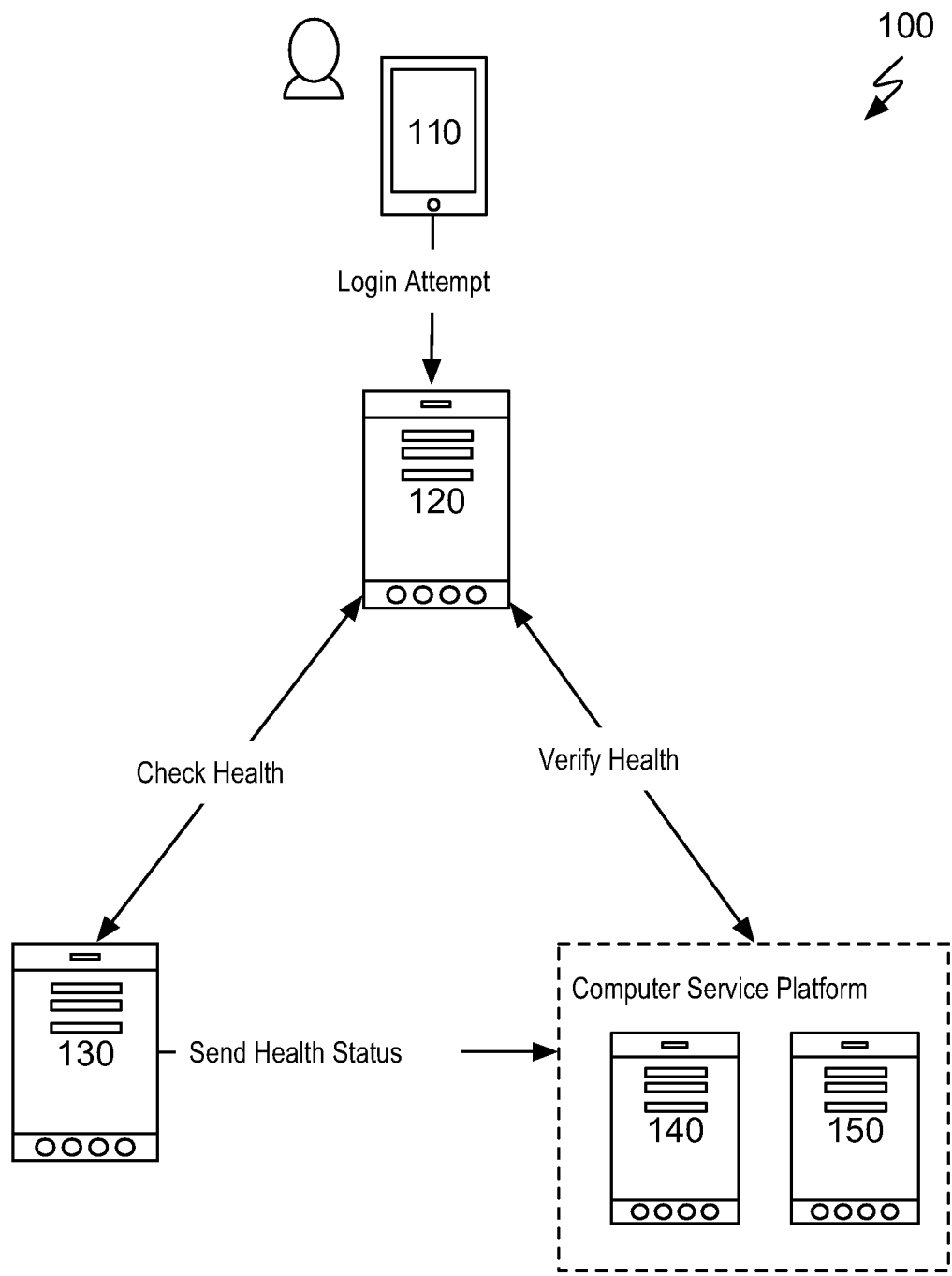
FIG. 1 illustrates a schematic representation of a system 100 for evaluating a health state of an endpoint and enforcing access policy in accordance with one or more embodiments of the present application.

As shown in FIG. 1, a system 100 agentless endpoint health enforcement using a non-agent application includes endpoint device 110, an iframe application 120, a non-agent application 130, and a computer security service 140, and a policy engine 150.

An endpoint 110 preferably includes any device used to access a web-accessible resource, including, but not limited to, web-accessible applications, web-accessible networks, web-accessible services, and any type of information on a network; for example, desktop computers, laptop computers, tablets, and smartphones. Other examples of an endpoint 110 include computer servers, bar code readers, kiosks, and point of sale (POS) terminals.

An iframe application 120 of a preferred embodiment may be deployed by a web server or the like and may be embedded in a web application (e.g., a website, an application accessible over the Internet, an application facilitating direct interfacing with the user in an interactive manner, etc.), a native application, and/or any suitable software. The iframe can include resources that are presentable in Silverlight, Flash, HTML 5, and/or any suitable media and/or multimedia player/plug-in. The iframe can include a block element such as a DIV, SPAN, or other HTML tag, embedded object, and/or any other suitable element. The iframe may be implemented as described in more detail in U.S. Pat. No. 9,930,060, which is incorporated by reference in its entirety by this reference.

A non-agent application 130 of a preferred embodiment functions to enforce the results of the policy engine 150. The non-agent application 130 is preferably a software component that is present on the endpoint of a user that typically provides some strong authentication functionality (e.g., multi-factor authentication, etc.). The non-agent application 130 preferably facilitates the authentication process. For example, basic HMAC-based One-time Password (HOTP), Time-based One-time Password (TOTP), or any suitable One-time Password (OTP) generation can be employed for mobile app-based authenticators to provide strong authentication. When the authenticator is invoked, either by the user or by the authentication service, the non-agent application 130 may enforce whether or not the endpoint is permitted for use as an authenticator device based on the results of the policy engine's output. The non-agent application 130 can also collect and transmit information from the mobile device to an authentication service that may be relevant to the evaluation of the defined policies. The non-agent application 130 may be built into the mobile software platform itself, installed as a third-party app by the user of the mobile device, or delivered via any other mechanism available to execute software on the mobile device. The non-agent application 130 preferably includes communication channels to at least the authentication system and/or policy engine.

A computer security service 140 of a preferred embodiment functions to secure and/or protect access to web-accessible services. The computer security service 140 is preferably a multitenant authentication service hosted in a distributed computing infrastructure. The authentication service is preferably a service used by a service provider or a subscribing entity to supplement or provide a layer of authentication (or optionally authorization) to the service provider system. The computer security service 140 is preferably configured to execute one or more steps of the methods described herein.

A policy engine 150 of a preferred embodiment may be implemented to regulate authentication attempts according to relevant policies of a subscriber to the authentication service. The policy engine 150 may be tasked with evaluating an authentication request and/or access request in the context of a defined policy and determining whether or not the endpoint is suitable for use as an authenticator device based on the result of that evaluation. The policy engine 150 preferably includes or has a communication channel to a policy database. The policy database preferably includes one or more authentication and/or access policies of a plurality of distinct subscribers to the computer security service. The policy engine 150 additionally can include a communication interface through which authentication requests are received. The policy engine 150 can be a standalone service used in combination with an outside authentication system but may alternatively be integrated in an authentication system. The policy engine 150 may alternatively be integrated with the authenticator and be located on the endpoint used as an authenticator device. Preferably, the policy engine 150 works in cooperation with a two-factor authentication (2FA) system of the remote computer security service 140. The particular policy evaluation procedure may consist of traditional Boolean logic expressions (e.g., "IF platform_version<2.3.2 AND component_version<1.5"), standalone services with rich functionality (e.g., analyze the applications installed on the endpoint to determine whether they are malicious or not), and any other processes or heuristics that may be appropriate to evaluate whether a mobile device is suitable for use as an authenticator. The policy engine 150 may be implemented as described in more detail in U.S. Pat. No. 8,763,077, which is incorporated herein by reference in its entirety by this reference.

2. Method for Agentless Device Health Enforcement Using a Non-Agent Application

As shown in FIG. 2, a method 200 for agentless device health enforcement includes using a non-agent application to enforce health standards at an endpoint during an authentication attempt to a web-based application/system. The method 200 preferably includes initializing a non-agent application at an endpoint S205, identifying health data requirements S210, collecting endpoint health data S220, transmitting the collected health data S230, generating endpoint health intelligence S240, identifying an authentication state and enforcing access policy S250, and setting computing resource access policy S260.

In a preferred embodiment, the method 200 may be implemented in circumstances involving an attempted authentication (or any non-authentication required attempt) by a user for accessing one or more web-based applications or web-accessible system using a mobile communication device or any suitable endpoint device. In such preferred embodiment, the mobile communication device may be an agentless device (i.e., an unmanaged device without an agent locally installed on a user's device). However, in a preferred circumstance, the mobile communication device of the user may include a lightweight authentication application (e.g., non-agent application, non-manager application, etc.) that is installed locally on the mobile communication device and that may typically function to operate for multi-factor (push) authentication, as well as any suitable authentication. The method 200 using the non-agent application may function to establish a trusted communication connection between the non-agent application and an application of a computer security service integrated with a web browser used in the attempted authentication to the web-based application or web-based service. In this way, a trusted health status of the mobile communication device may be determined by the local non-agent application and access to the web-based application or web-based service may be evaluated according to an access policy and the determined health status of the mobile communication device.

It shall be noted that while in one or more preferred embodiments of the present application, a mobile communication device may be a preferred implement for accessing a protected web application or web service; the method 200, however, may also be implemented with any suitable endpoint device, including, but not limited to, a desktop, a laptop, a tablet, a gaming system, or any suitable computing device that may operate to access or attempt to access a protected web-based application, web-based systems, web-based service, and/or other computing resources.

2.1 Initializing Non-Agent Application on User Device

Responsive to an attempt to authenticate to a web-based computing resource (e.g., web application, web-based system, and/or a web-based service, etc.) with an endpoint device, S205, which includes initializing or triggering an activation of a non-agent application at the endpoint device, functions to generate a prompt via a web browser implemented by the endpoint device for performing a health check of the endpoint using the non-agent application. That is, the web-based computing resource may preferably be a resource offered by a subscriber to the remote computer security service and protected by the remote computer security service. Accordingly, an attempted access to the computing resource may function as a trigger for initializing the non-agent application hosted on the endpoint device.

In one or more embodiments, the non-agent application may preferably be an application of a web-based computer security service, which is sometimes referred to herein as a remote security service or a remote authentication service. Accordingly, in use, the non-agent application may typically be used for multi-factor authentication. However, as described in several embodiments of the present application, the non-agent application may be leveraged for performing one or more of a vulnerability assessment, health assessment, and/or a security assessment of an endpoint device on which it may be hosted.

In a preferred embodiment, S205 may function to trigger the presentation of a prompt via a browser operating on an endpoint of a user based on a detection of an authentication attempt by the user to a web-based computing resource with the endpoint. Accordingly, based on identifying the authentication attempt, S205 may include receiving an authentication attempt signal or transmission indicating an occurrence of the authentication attempt. Preferably, the authentication attempt signal may be transmitted by one or more systems of a subscriber and received at a remote security service to which the subscriber is subscribed. In some embodiments, the authentication attempt signal may include identification data associated with one or more of the endpoint device and/or a user associated with the endpoint device making the access attempt. In such embodiments, the attempt signal may additionally or alternatively include authentication credentials (e.g., username and/or password) provided during the authentication attempt. In such instances, one or more parts of the authentication credentials data (e.g., a username) may be used as an identifier.

Additionally, or alternatively, in response to detecting the access attempt to the web-based computing resource of the subscriber, S205 may function to identify a user or endpoint account data relating to an account hosted by the remote security service. Preferably, S205 may function to enable the remote security service to identify the user account data based on identification data provided with an access attempt signal from the subscriber to the service. Based on identifying the user account, S205 may function to identify the non-agent application hosted on the endpoint device and/or a communication address of the endpoint device attempting the access to the web-based computing resources. Responsively, S205 may further enable the remote security service to generate a security prompt (prompt) and transmit the prompt the identified non-agent application based on a communication address or the like of the endpoint device or of the non-agent application.

Figure 3:
FIG. 3 illustrates an example view of a browser of an endpoint in accordance with one or more embodiments of the present application.
Figure 4:
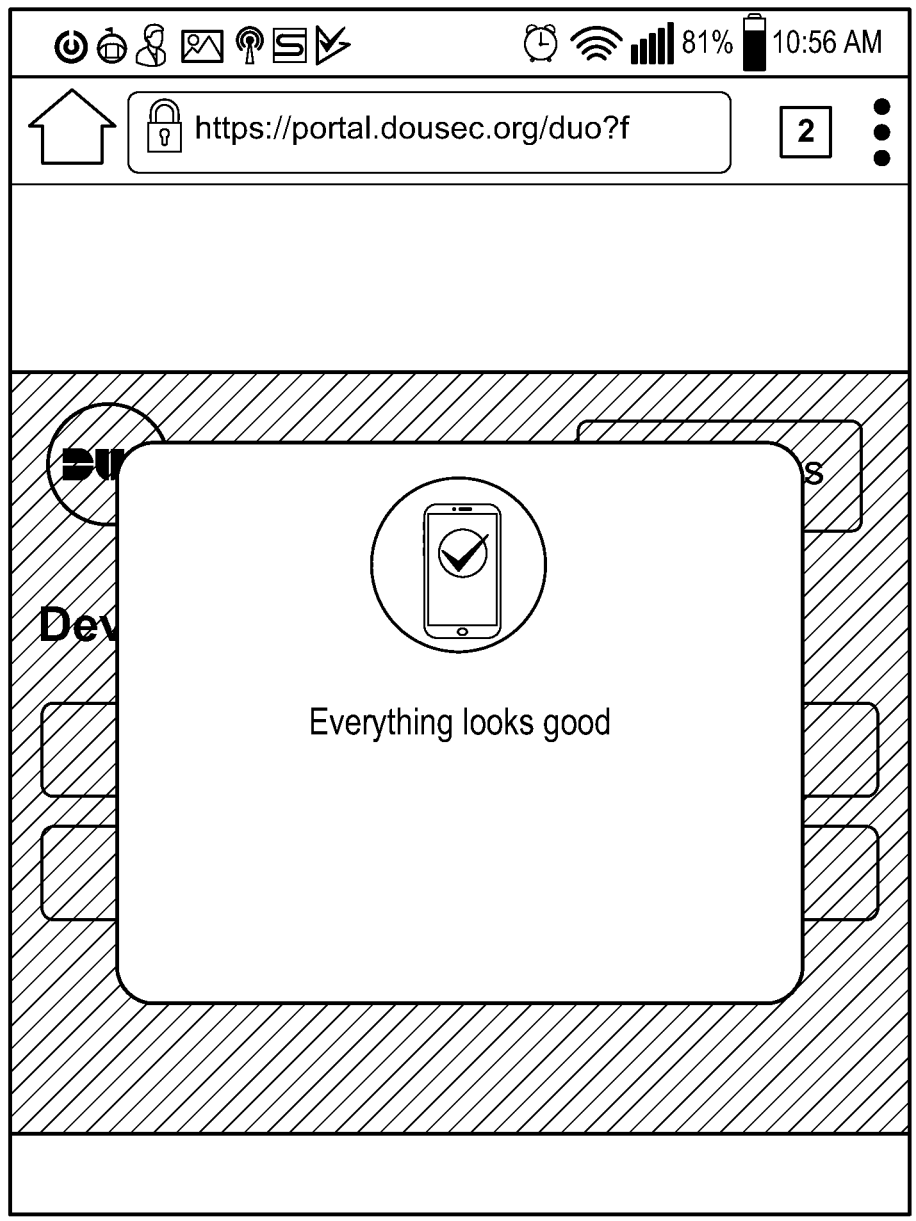
FIG. 4 illustrates an example view of a browser of an endpoint in accordance with one or more embodiments of the present application.

Preferably, the prompt may be presented via an authentication webpage displayed via the web browser operated by the endpoint device and may include a request or instructions directing the user of the endpoint to initialize and/or activate a non-agent application residing locally on the endpoint for completing a health check of the device as a requirement for authenticating the user and/or accessing the web-based computing resource with the endpoint device, as shown by way of example in FIG. 3. Additionally, or alternatively, a notification may be pushed to the non-agent application and once the notification is opened by a user of the endpoint, the non-agent application may function to expose the prompt to the user. An initialization of the non-agent application preferably functions to transition the non-agent application from a sleep (or dormant) state to a wake state or an inactive state to an active state for the purposes collecting endpoint health data from the endpoint and/or performing an assessment of the endpoint health data.

In some embodiments, an inline frame (iframe) or similar application of a remote computer security service may be integrated with or embedded in the browser operated by the endpoint. The iframe operating integratively with the web browser may function to generate and display the prompt or the instructions to the user via the browser operating on the endpoint during the attempt to authentication to the web-based computing resource.

Responsive to the prompt or instructions presented to the user via the iframe or the like, in one implementation, the user may (manually) initialize or activate the non-agent application hosted on the endpoint of the user by selecting or otherwise, performing any suitable operation for deploying the non-agent application for performing a health check of the endpoint. Additionally, or alternatively, the user may function to automatically activate the non-agent application by selecting the prompt presented within the authentication page. In such embodiments, selecting the prompt may function to transmit an activation or opening signal to the non-agent application that operates to activate or open the non-agent application for performing a health check of the endpoint device. In one or more embodiments, performing a health check using the non-agent application may be a secondary function (non-primary function) or secondary operation of the non-agent application. Thus, the activation or opening signal, in some embodiments, includes instructions indicating that a non-primary function and/or a secondary function of performing a health check is being requested to be performed by the non-agent application.

In another implementation, the prompt or instructions presented to the user may include a request to check a health status of the endpoint together with a selectable feature or the like that the user of the endpoint may select or confirm that enables the iframe (or an application of the computer security service operating the iframe) to scan (e.g., query the endpoint) the endpoint for or identify the non-agent application hosted on the endpoint. Once the non-agent application is identified or is located by the iframe, S205 using the iframe automatically initialize the non-agent application for initiating the health check of the endpoint by the non-agent application. Specifically, S205 may function to initialize the non-agent application by providing activation or wake instructions to the non-agent application via the iframe in preparation for performing a health check by the non-agent application.

In some embodiments, the non-agent application may include an application that may be utilized in multi-factor authentication of a user for a transaction but may also be used for any suitable type of authentication. Preferably, the non-agent application is an application that is registered with the remote computer security service and may be used for implementing at least one factor of authenticating a user and performing a health check of and endpoint on which the non-agent application is hosted.

In one variant, S205 may function to use an iframe integrated with a browser implemented by an endpoint of a user to scan or query the endpoint of the user for an agent application when it is determined that the endpoint comprises a managed device. In this case, S205 may function to use the iframe to activate and/or request that the agent application perform the health check of the endpoint and return health metrics related to the health check. An endpoint may be considered a managed device if it includes an agent application or the like that may function to control one or more operations and/or features of the endpoint.

Accordingly, if S205 identifies a non-agent application hosted on the endpoint of the user, S205 may function to establish a communication channel (or a cryptographically secured pairing) between the non-agent application hosted on the endpoint and the iframe integrated with the browser. Preferably, the communication channel between the non-agent application and the iframe is a direct communication channel that may be encrypted throughout an entirety of a communication session within the direct communication channel or communication connection.

Via the communication channel between the non-agent application and the iframe, the method 200 may function to exchange data between the non-agent application and the iframe integrated with the browser including, but not limited to, health metrics/health data of the browser, health data requirements, vulnerability data, vulnerability patches for detected health threats, and the like.

2.2 Identifying Health Data Requirements

S210, which includes identifying endpoint health requirements, functions to identifying health data requirements for a given authentication session. Specifically, in some embodiments, S210 functions to use the computer security service application or an iframe integrated with the browser of the endpoint to determine endpoint health requirements for evaluating the endpoint during the authentication attempt.

Endpoint health requirements preferably include criteria that endpoint health data should (or must) meet for particular network policies. Endpoint health requirements preferably include acceptable operating system, browser, and plug-in version numbers (i.e., these must be current to within some set of versions established by endpoint health requirements) but may additionally or alternatively include any suitable requirements based on endpoint health data. Endpoint health requirements can include expected endpoint health data (e.g., desirable endpoint health data that reduces security vulnerabilities, etc.), unexpected endpoint health data (e.g., an operating system type that was not expected of endpoint user devices associated with a network), administrator-established requirements (e.g., endpoint health requirements selected by a network administrator), and/or any other suitable data.

Endpoint health requirements are preferably linked to network access policies. As a first example, an endpoint may need to meet a particular set of endpoint health requirements in order to access a network or service. As a second example, the level of network access granted to an endpoint may be determined by the class of endpoint health requirements met by the endpoint.

In a first implementation, during an attempt to authenticate to a web-accessible computing resource or application, S210 implementing an iframe integrated with a browser of an endpoint of a user may function to use the iframe to query a (endpoint health) policy engine to determine endpoint health requirements (standards) for enabling a successful authentication with the endpoint of the user. Accordingly, in response to the query, S210 may function to receive health requirements mapped or designated to the subject web-accessible computer resource or application.

In some embodiments, the policy engine may be implemented by one or more computer (web) servers associated with the remote computer security service. Preferably, the policy engine includes and/or is associated with a policy database storing therein a plurality of endpoint health requirements for a plurality of distinct and/or disparate service providers or computer resource providers.

In a second implementation, during an authentication attempt, S210 may function to use an iframe integrated with a browser of the endpoint to query a service provider or resource provider associated with the subject web-accessible computer resource or application for endpoint health requirements.

Preferably, the query may be generated by the iframe integrated with the browser based on one or more attributes of the access or access session involving the authentication attempt. Accordingly, the collection of data relating to the attributes of the session may be referred to herein as session data and the query preferably comprises selective session data. In some embodiments, session data may include one or more attributes relating to one or more of an application-type, service-type, computer resource-type that a user may be attempting to access, endpoint device data (e.g., high-level features identifying a device type, such as iPhone, Android-based phone, etc.), IP address of an endpoint, a time of day of the session, and the like. For instance, depending on a security level required for accessing a given application type, a higher or lower endpoint health requirements may be required. Thus, in some embodiments, a policy engine may include predetermined mapping between various attributes of a session and varying endpoint health requirements for a given service or web resource provider.

Responsive to identifying endpoint health requirements for a given session, S210 may function to transmit the endpoint health requirements to non-agent application of the endpoint. Preferably, S210 transmits the endpoint health requirements from the iframe integrated with the browser via the communication connection to the non-agent application of the endpoint.

In some embodiments, S210 may function to use the iframe to construct or configure one or more probes for collecting endpoint health data from the endpoint based on the identified endpoint health requirements. In such embodiments, the iframe may function to transmit the preconfigured probes to the non-agent application and the non-agent application may function to use the preconfigured probes for collecting endpoint health data from the endpoint.

Additionally, or alternatively, Step S220 may include collecting endpoint health data in any suitable manner, e.g., via a proxy server (henceforth referred to as 'proxy collection'), via a third party (henceforth referred to as 'third party collection'), and/or via a host agent (henceforth referred to as 'host agent collection').

2.3 Collecting Endpoint Health at Local Non-Agent Application

S220, which includes collecting endpoint health data, functions to acquire endpoint health data based on a cooperation between a non-agent application and the (iframe) application integrated with a browser of an endpoint.

Using the non-agent application, S220 preferably functions to collect data from the endpoint that can be used to evaluate any potential security vulnerabilities and determine whether the endpoint meets minimum health requirements for accessing a given application or computing resource. Endpoint data collected via the non-agent application in S220 preferably includes presence and operation details (e.g., version number) of potentially vulnerable applications or other programs operating on an endpoint; for example, operating systems, internet browsers, plug-ins (e.g., Java, Flash), office suite software (e.g., iWork, Microsoft Office), document readers (e.g., Adobe Acrobat), and connectivity software (e.g., VPN apps).

In a variation, S220 may function to collect endpoint health data via a device management agent (agent) when it is determined that the endpoint is a managed endpoint. In this variation, S220 may function to check a certificate of the agent operating on the endpoint. In a specific embodiment, the certificate may be a certificate generated by the remote computer security service that is deployed through a service provider of the agent. At or during an authentication attempt, an iframe integrated with a browser of the endpoint may specifically request the certificate to determine whether the endpoint is still managed by the agent. In the case that the certificate is returned to the iframe and validated by the remote computer security service as being up-to-date (e.g., a most recent version of the certificate), S220 may function to collect endpoint health data from the agent directly.

In a further variant, at or during an authentication attempt, S220 may function to determine whether an endpoint is a managed device and collected endpoint health data based on the management status by using an iframe integrated with a browser of the endpoint to query or request endpoint device identification value (e.g., serial number of the endpoint device or the like). The remote computer security may function to use one or more application programming interfaces to confirm or validate with a vendor associated with the management agent whether the endpoint is currently managed and compliant with access policies.

Endpoint health data may additionally or alternatively include any data relating to security vulnerabilities on an endpoint, including data relating to endpoint hardware. For example, endpoint health data may include network traffic or other data produced during endpoint operation; this data may be analyzed to determine potential vulnerabilities. As another example, collecting the endpoint health data can include performing digital fingerprinting of an endpoint user device in order to collect hardware properties of the endpoint user device, where the endpoint health data can include the hardware properties. Hardware properties of a device can include one or more of: battery properties (e.g., battery type, battery life, state of charge, etc.), processor characteristics (e.g., processor speed, etc.), display characteristics, allowed user interface actions, storage, weight, sensor properties (e.g., location sensors, motion sensors, etc.), hardware type (e.g., mobile phone, laptop, computer, tablet, smart watch, etc.) communication properties (e.g., Bluetooth enabled, wireless transceiver information, etc.), and/or any other suitable hardware properties of devices.

2.4 Loading Health Data

S230, which includes transmitting the collected endpoint health data, functions to transmit the health data collected by the non-agent application of the user device to the iframe application integrated within a browser of an endpoint of a user or directly to a remote computer security service. Specifically, during an authentication attempt, the non-agent application may function to collect endpoint health data according to one or more endpoint health data requirements and securely pass the collected endpoint health data to the iframe using one or more data transmission methods.

2.4.1 Universal Link for Health Data Collection & Transfer

In a first implementation, S230 may function to launch a universal link (URL) and load endpoint health data via the URL. In this first implementation, once the non-agent application is initialized or activated, the non-agent application may function to launch a universal link that may be registered by the non-agent application.

After opening the universal link, S230 may function to use the non-agent application to collect endpoint health data (S220) from the endpoint device of the user and load the collected endpoint health data as well as session data via the opened website associated with the universal link. In a preferred embodiment, the universal link for loading endpoint health data may be implemented via Universal Links. Universal Links may function to enable a two-way association between the non-agent application hosted on the endpoint of the user and a website registered to the non-agent application. Thus, when the non-agent application opens the universal link, a website associated with the universal link may be opened and displayed via the endpoint of the user and further, used by the non-agent application to receive and/or load endpoint heath data being collected by the non-agent application. Resultantly, a remote computer security service associated with the iframe integrated with the browser of the endpoint may function to receive or collect the endpoint health data together with any session data from the universal link. In some embodiments, the universal link may include a direct data transfer path for transmitting the collected endpoint health data and session data to the remote computer security service.

Accordingly, once sufficient endpoint health data has been collected via the universal link, S230 may function to automatically revert to an authentication page. That is, once the non-agent application indicates that a loading of the endpoint health data via the universal link is completed, S230 may function transition the browser of the endpoint from a website of the universal link back to the authentication page that is being actively used to authenticate the user to the web-accessible service, application, or computing resource.

Alternatively, in some embodiments, once the non-agent application completes a loading of the collected endpoint health data and/or session data, S230 may function to prompt the user associated with the endpoint to manually revert back to the authentication page for the web-based application or web-based service, etc.

2.4.2 Clipboard for Health Data Collection & Transfer

In a second implementation, S230 may function to load endpoint health data and/or session data to a clipboard to enable a transmission of the endpoint health data and/or session data to an iframe integrated into a browser of the endpoint. A clipboard as referred to herein preferably includes or relates to an area of storage or memory of the endpoint to which collected endpoint health data may be stored temporarily or the like prior to retrieval and transmission. In this second implementation, once the non-agent application is initialized or activated, S230 may function to use the non-agent application to implement or setup a clipboard or dedicated storage area on the endpoint for storing collected endpoint health data and/or session data and enabling a transmission of the endpoint health data to the iframe integrated with the browser.

Accordingly, in this second implementation, S230 may function to implement a clipboard on the endpoint to enable an iframe integrated with the browser and the non-agent application to communicate and/or exchange endpoint health data and/or session data.

In a third implementation, S230 may function to enable the non-agent application to transmit collected endpoint health data and/or session data directly to the iframe via the communication channel.

Additionally, or alternatively, one or more data packets encapsulating the collected endpoint health data and/or session data may be cryptographically signed by the non-agent application. In such embodiments, the non-agent application may function to use an asymmetric or symmetric cryptographic key for cryptographically signing the data packet. Preferably, if the cryptographically signed data packet is received and transmitted by the iframe, the iframe may be prevented from inspecting contents of the data packet without the proper cryptographic keys. Rather, in some embodiments, S230 may function to use the iframe as a conduit from transmitting the data packet between the non-agent application and a computer security service. Upon receipt, the computer security may function to confirm and/or decrypt the data packet with the appropriate cryptographic keys.

2.5 Generating Endpoint Health Intelligence

S240, includes generating endpoint health intelligence, functions to generate data describing endpoint health and insights regarding a health status of an endpoint based on the collected endpoint health data and/or session data. S240 preferably includes evaluating endpoint health data against endpoint health requirements (e.g., comparing endpoint health data to predetermined endpoint health standards/requirements), but may additionally or alternatively include analyzing endpoint health data in any suitable manner to determine endpoint health (e.g., using heuristics) and/or an endpoint health status of the endpoint.

Endpoint health intelligence preferably indicates endpoint security health of one or more endpoint user devices but can indicate any other suitable characteristic. Endpoint health intelligence may include reports for specific events (e.g., successful or failed login), specific endpoints, groups of endpoints, the network as a whole, and/or for any other suitable subject. Generating endpoint health intelligence preferably includes generating endpoint health intelligence from endpoint health data (e.g., the endpoint health data collected in S220). In an example, generating the endpoint health intelligence includes generating the endpoint health intelligence based on the operating system type and the operating system version. Additionally, or alternatively, endpoint health intelligence can be generated based on supplemental information (e.g., information about a user, information about services offered on the network, session data, etc.). For example, endpoint health intelligence can be generated from processing endpoint health data of an endpoint user device with information about a user's adherence to timely updating software on the user's various devices. Additionally, or alternatively, endpoint health intelligence can be generated based on hardware properties of endpoint user devices. For example, the method 100 can include collecting hardware properties of the endpoint user device; generating an endpoint device profile from the hardware properties; where generating endpoint health intelligence comprises generating endpoint health intelligence from the endpoint device profile. However, endpoint health intelligence can be generated from any suitable information.

Generating endpoint health intelligence can be performed partially or fully by one or more of: a remote server (e.g., a remote server associated with an iframe collecting endpoint health data), a device associated with a user and/or administrator, a remote computer security service implemented by one or more computer servers, and/or any other suitable entity.

Temporally, generating endpoint health intelligence is preferably performed in response to receiving endpoint health data at the component (e.g., a remote server) that generates endpoint health intelligence. For example, in response to collecting endpoint health data at an iframe embedded in a web application, endpoint health intelligence can be generated from such endpoint health data. Additionally, or alternatively, endpoint health intelligence can be generated after a threshold (e.g., by size, types of an endpoint health data, endpoint health data across a threshold number of devices, etc.) of endpoint health data is gathered. Generating endpoint health intelligence is preferably generated in real-time (e.g., during an authentication session of an endpoint user device at an iframe used for both authentication and collection of endpoint health data). However, endpoint health intelligence can be generated at any suitable time in any suitable manner.

In a first variation, generating endpoint health intelligence can include comparing endpoint health data to endpoint health standards. Specific endpoint health data types (e.g., browser type, browser, version, etc.) can be compared to specific endpoint health standards related to the endpoint health data types. For example, endpoint health data of operating system type and operating system version can be compared to endpoint health standards of an expected operating system type (e.g., an operating system type that an administrator of a network expects users of the network to possess) and an expected operating system version. Additionally, or alternatively, endpoint health data profiles (e.g., a profile of the different applications and their versions operating on an endpoint user device) can be compared as a whole to endpoint health standards for such profiles. However, any granularity of endpoint health data can be compared to any granularity of endpoint health standards in generating endpoint health intelligence.

In the first variation, comparing endpoint health data to endpoint health standards can include the extent to which endpoint health standards are satisfied by the endpoint health data. In a specific example, browser type and browser version collected from an HTTP user-agent header received at an iframe can be compared against endpoint health standards specifying browser type "A" and at least browser version "5.3." The collected browser types and versions of endpoint user devices can be compared to the standards, and endpoint health intelligence can be generated based on the comparison. Lack of satisfaction of an endpoint health standard can indicate a security vulnerability of the endpoint user device. For example, generating the endpoint health intelligence can include identifying a security vulnerability associated with the endpoint health data (e.g., based on an endpoint health data property failing to meet an endpoint health standard). Administrators and/or users can be notified of identified vulnerabilities, where an endpoint health notification can include an indication of the security vulnerability. In the first variation, endpoint health intelligence can indicate the number (e.g., number of endpoint health standards not met), type (e.g., type of endpoint health standard not met), degree (e.g., a level of security vulnerability based on the degree to which the endpoint health standards were not met), and/or any suitable characteristic regarding the failure of endpoint health data to meet endpoint health standards. However, comparing endpoint health intelligence and endpoint health standards can be performed in any suitable manner.

2.6 Identifying an Authentication State and Enforcing Computing Resource Access Policy S250, which includes identifying a health state of the endpoint and enforcing access policy, functions to identify a health status of the endpoint based on a processing of the endpoint health data and resultantly, enforcing an access policy based on a health state and identified authentication state of the user.

In a preferred embodiment, S250 may function to calculate or identify a health state of the endpoint device based on the evaluation of the endpoint health data, namely based on the endpoint health intelligence. In one embodiment, S250 may function to identify a health state of the endpoint selected from a plurality of distinct health states. The plurality of distinct health states may be arranged or found along a continuum of endpoint health states, such that at a first end of the continuum is a most unhealth device state and at an opposite of the continuum is a most healthy device state with intermediate states continuously increasing or decreasing in a positive or negative health state. For instance, based on endpoint health intelligence, S250 may identify a first endpoint as "unhealthy", a second device as "somewhat unhealthy", and a third device as "healthy".

Preferably, each distinct health state of the plurality of health states along the health state continuum may be defined based on the one or more requirements of the access policy of a subscriber. In such instances, the access policy of a subscriber may designate distinct health standards and/or health requirements for each of the plurality of distinct health states along the continuum together with a resultant access policy enforcement requirement. Accordingly, in some embodiments, the health state continuum may be bounded by an unhealthy state and a healthy state with one or more intermediates computable states of health for an endpoint. As a health state moves along the continuum from a healthy state to an unhealthy state, the enforcement requirements may correspondingly increase of from a least restrictive enforcement requirement (e.g., no restriction to access) to a most restrictive requirement (e.g., restriction to access and vulnerability corrections, etc.).

Accordingly, using the health state of the endpoint, S250 may function to additionally or alternatively enforce access policy for the given web-service, web-application, and/or web-accessible computing resource. In such instance, S250 may function to an access policy enforcement based on a mapping of the identified health state of the endpoint to one or more enforcement mechanism derived from access policy.

Figure 5:
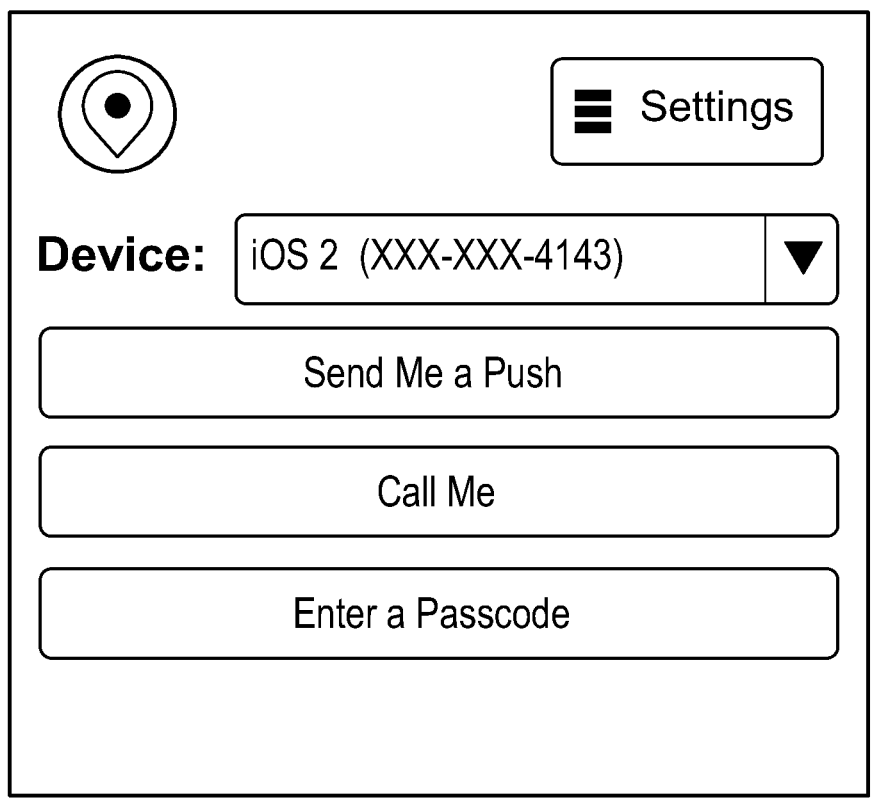
FIG. 5 illustrates an example view of a browser of an endpoint in accordance with one or more embodiments of the present application.
Figure 6:
FIG. 6 illustrates an example view of a browser of an endpoint in accordance with one or more embodiments of the present application.

Preferably, each of the endpoint health states of the endpoint health continuum is mapped to a distinct response at the remote computer security platform. For instance, in the case that S250 provides an indication that the endpoint of the user is "healthy", S250 may function to trigger a predetermined response comprising a notification to the user that the endpoint is healthy together with a requirement to move forward with two-factor authentication with the endpoint being a conduit for performing the second factor of authentication (the first factor of authentication being performed within the browser, etc.), as shown by way of example in FIGS. 5-6. In a second example, in the case that S250 provides an indication that the endpoint of the user is "unhealthy", S250 may function to trigger a predetermined response comprising a notification to the user that the endpoint is "unhealthy" together with an indication that the transaction or attempt to authenticate to the web-service is "blocked", as shown by way of example in FIG. 6. In yet a third example, in the case that S250 provides an indication that the endpoint of the user is "unhealthy", S250 may function to trigger a predetermined response comprising a notification to the user that the endpoint is "unhealthy" together with an indication one or more steps a user can take to resolve vulnerabilities associated with the endpoint. In yet of fourth example, if S250 identifies the endpoint as "unhealthy" or "somewhat unhealthy", S250 may trigger a notification to the user via the iframe in a browser of the user, the notification comprising an indication that the device is "unhealthy" together with modified (or limited or restricted) access to the web-service.

Accordingly, the identified health status of the endpoint of a user along with the results of a first factor of authentication may be combined and/or used by the remote computer security service to either block an authentication or allow an authentication of the endpoint to the web-service or application.

Additionally, or alternatively, the endpoint health notification can include any amount or combination of: endpoint health intelligence, endpoint health standards, endpoint health data, user information, network information, and/or any other suitable information. For example, generating the endpoint health notification can include generating an endpoint health notification including a vulnerability warning, in response to endpoint health data failing to meet and endpoint health standard. The form of endpoint health notifications can include one or more of: verbal content (e.g., endpoint user device "A" is currently using web browser "B", etc.), numerical content (e.g., 80% of users in the network over the past week have used operating system "X" in accessing the network, etc.), graphical content (e.g., a notification highlighted in red to illustrate a high level of security risk for an endpoint user device, etc.), audio content, and/or any other suitable form.

Generating an endpoint health notification is preferably in response to generating endpoint health intelligence. Further, generating the endpoint health notification is preferably performed in real-time (e.g., during a user's attempt to authenticate and access local area network).

2.7 Setting Endpoint Access Policy

Optionally, S260, which includes setting endpoint access policy to a web-accessible resource, functions to set endpoint access policy on web service-per-web service (app-per-app) basis to limit or restrict access to sensitive web-accessible resources based on an endpoint's managed status or identified health status.

Additionally, or alternatively, S260 may function to set network access policies for endpoints based on how endpoint health data is evaluated relative to endpoint health standards and network access policies associated with those endpoint health standards. Network access policies may include rules determining whether an endpoint is allowed to connect to a network, what kind of connection the endpoint may have with the network (e.g., through which VLAN, if any; through which ports, etc.), what services and/or ports the endpoint may access on the network, what data the endpoint may access on the network, quality of service (QOS) settings, etc.

Setting network access policies can be performed in real-time, and/or at any suitable time in relation to any portion of the method.

S260 preferably includes setting network access policies according to rules determined by administrators but may additionally or alternatively include setting network access policies based on rules derived automatically. For example, S260 may include blocking network access for endpoints exhibiting a vulnerability discovered by S230 until administrator intervention is available. In another example, S260 can include setting a network access policy for a network based on endpoint health intelligence generated for an endpoint user device attempting to access the network.

S260 may include setting network access policies based on additional information, such as time and/or event count. For example, S260 may include setting a network access policy that allows a user with outdated software to access the network for 48 hours; the user is notified that he/she has 48 hours to update his/her software (after which point, the endpoint will be blocked if the software is not updated). Likewise, Step S140 may include setting a network access policy that allows a user with outdated software to login to the network a limited number of times before being blocked. However, network access policies can be set according to any suitable criteria. Further, setting network access policies can be performed in any suitable fashion.

One or more instances of the method and/or processes described herein can be performed asynchronously (e.g., sequentially), concurrently (e.g., in parallel), or in any other suitable order and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A method for securing one or more web-based services of a subscriber to a remote computer security service, the method comprising:
   identifying an access attempt by an agentless endpoint device to access one or more web-based services of a subscriber to a remote computer security service;
   prior to providing access to the one or more web-based services, transmitting by the remote computer security service a security prompt to a third-party web browser operating on the agentless endpoint device;
   activating at the agentless endpoint device a non-agent security application hosted locally on the agentless endpoint device in response to the security prompt, wherein activating the non-agent security application integrates an operation of the non-agent security application with an operation of the third-party web browser;
   obtaining by the non-agent security application device health data relating to one or more attributes of the agentless endpoint device;
   computing by the remote computer security service a health state of the agentless endpoint device based on an assessment of the device health data; and
   enforcing an access policy of the subscriber by denying or enabling access to the one or more web-based services of the subscriber by the agentless endpoint device based on the computed health state.

2. The method according to claim 1, wherein the agentless endpoint device includes a computing device without a device management agent of the subscriber installed locally on the computing device.

3. The method according to claim 1, wherein the security prompt includes a request to open a security application (multi-factor authentication application) of the remote computer security service that is hosted on the agentless endpoint device.

4. The method according to claim 1, wherein the non-agent security application that is hosted locally at the agentless endpoint device includes an application of and provided by the remote computer security service.

5. The method according to claim 4, wherein the non-agent security application is configured with:
   a primary function for performing at least one part of a multifactor authentication of a user of the agentless endpoint device; and
   a secondary function for performing a security health assessment of the agentless endpoint device.

6. The method according to claim 1, wherein activating the non-agent security application automatically loads a universal link that is registered by the non-agent security application that enables the non-agent security application to collect device health data from the agentless endpoint device and pass the device health data to the remote computer security service.

7. The method according to claim 1,
   wherein integrating the operation of the non-agent security application with the operation of the third-party web browser instantiates a communication channel between the non-agent security application and the third-party web browser through which device health data is passed from the non-agent security application to the third-party web browser.

8. The method according to claim 7, wherein activating the non-agent security application instantiates an inline frame of the remote computer security service that is integrated with the third-party web browser of the agentless endpoint device, wherein the non-agent security application passes device health data through the inline frame operating with the third-party web browser to the remote computer security service.

9. The method according to claim 8, wherein the non-agent security application stores device health data within a clipboard memory of the agentless endpoint device, and the non-agent security application passes the device health data from the clipboard to the inline frame operating with the third-party web browser.

10. The method according to claim 1, further comprising: at the remote computer security service:
    identifying access policy of the subscriber;
    assessing the device health data against the access policy of the subscriber; and
    computing a response to the access attempt based on the assessment of the device health data against eh access policy of the subscriber.

11. The method according to claim 1, further comprising:
    prior to passing the device health data to the remote computer security service, cryptographically signing by the non-agent security application one or more data packets encapsulating the device health data; and
    decrypting the one or more data packets only by the remote computer security service.

12. The method according to claim 1, wherein the remote computer security service selects the health state from a continuum of endpoint health states based on an assessment of the device health data against access policy of the subscriber, wherein the continuum of endpoint health states is defined based on the access policy of the subscriber.

13. The method according to claim 1, wherein enforcing the access policy of the subscriber includes communicating an enforcement result of the assessment of the device health data from the remote computer security service to the non-agent security application, wherein the enforcement result includes confirmation or denial of access to the one or more web-based services of the subscriber.

14. The method according to claim 13, wherein in response to the enforcement result including a denial of access to the one or more web-based services of the subscriber, providing the enforcement result by denying or enabling access to the one or more web-based services of the subscriber based on the assessment of the device health data.

15. A system for securing one or more web-based services of a subscriber to a web-based authentication service, the system comprising:
    a distributed network of computers that includes a first one or more computer processors, a first one or more computer readable storage media, and a first set of program instructions collectively stored on the first one or more computer readable storage media for execution by at least one of the first one or more computer processors, the first set of program instructions comprising instructions to implement a web-based authentication service that:
  identifies an access attempt by an agentless endpoint device to access one or more web-based services of a subscriber to the web-based authentication service, wherein the agentless endpoint device includes a second one or more computer processors, a second one or more computer readable storage media, and a second set of program instructions collectively stored on the second one or more computer readable storage media for execution by at least one of the second one or more computer processors, wherein the second setof program instructions comprise instructions to implement anon-agent security application; and
  prior to providing access to the one or more web-based services, transmits a security prompt to a third-party web browser operating on the agentless endpoint device; and
the non-agent security application hosted locally on the agentless endpoint device that is activated in response to the security prompt, wherein activating the non-agent security application integrates an operation of the non-agent security application with an operation of the third-party web browser, and that:
  obtains device health data relating to one or more attributes of the agentless endpoint device, wherein the web-based authentication service further:
  computes a health state of the agentless endpoint device based on an assessment of the device health data; and
  enforces an access policy of the subscriber by denying or enabling access to the one or more web-based services of the subscriber by the agentless endpoint device based on the computed health state.

16. The system according to claim 15, wherein the non-agent security application that is hosted locally at the agentless endpoint device includes an application of and provided by the web-based authentication service.

17. The system according to claim 16, wherein
the non-agent security application is configured with:
  a primary function for performing at least one part of a multifactor authentication of a user of the agentless endpoint device; and
  a secondary function for performing a security health assessment of the agentless endpoint device.

18. The system according to claim 15, wherein
activating the non-agent security application automatically loads a universal link that is registered by the non-agent security application that enables the non-agent security application to collect device health data from the agentless endpoint device and pass the device health data to the web-based authentication service.

19. The system according to claim 15, wherein integrating the operation of the non-agent security application with the operation of the third-party web browser instantiates a communication channel between the non-agent security application and the third-party web browser through which device health data is passed from the non-agent security application to the third-party web browser.

20. The system according to claim 19, wherein activating the non-agent security application instantiates an inline frame of the web-based authentication service that is integrated with the third-party web browser of the agentless endpoint device, wherein the non-agent security application passes device health data through the inline frame operating with the third-party web browser to the web-based authentication service.

* * * * *